…

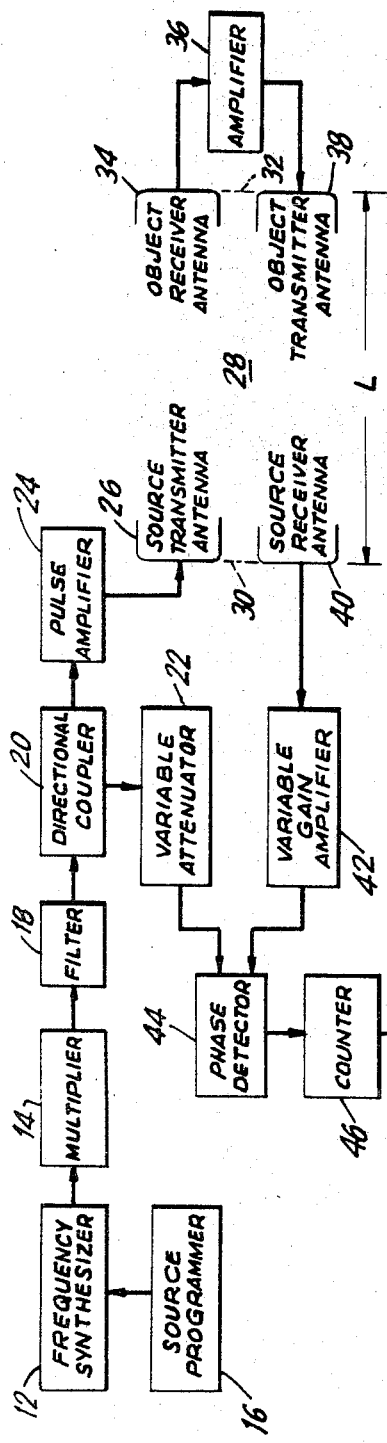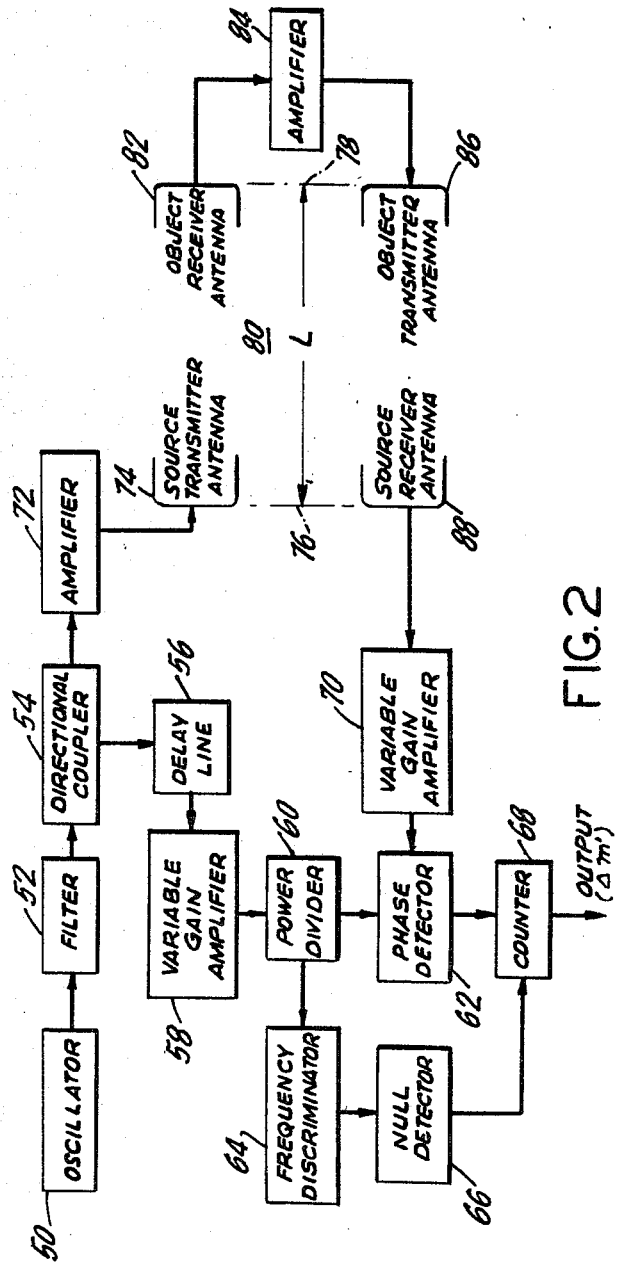

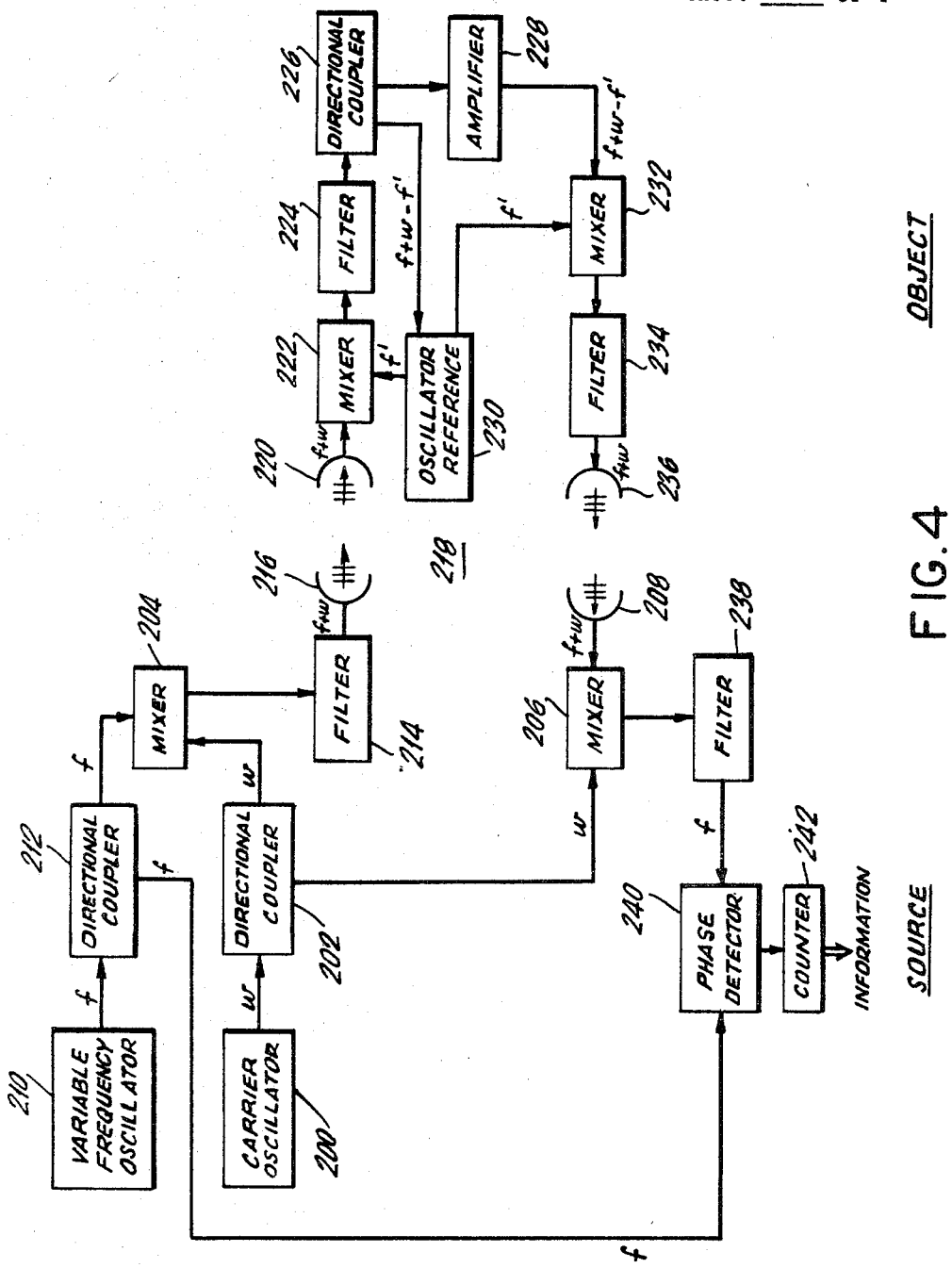

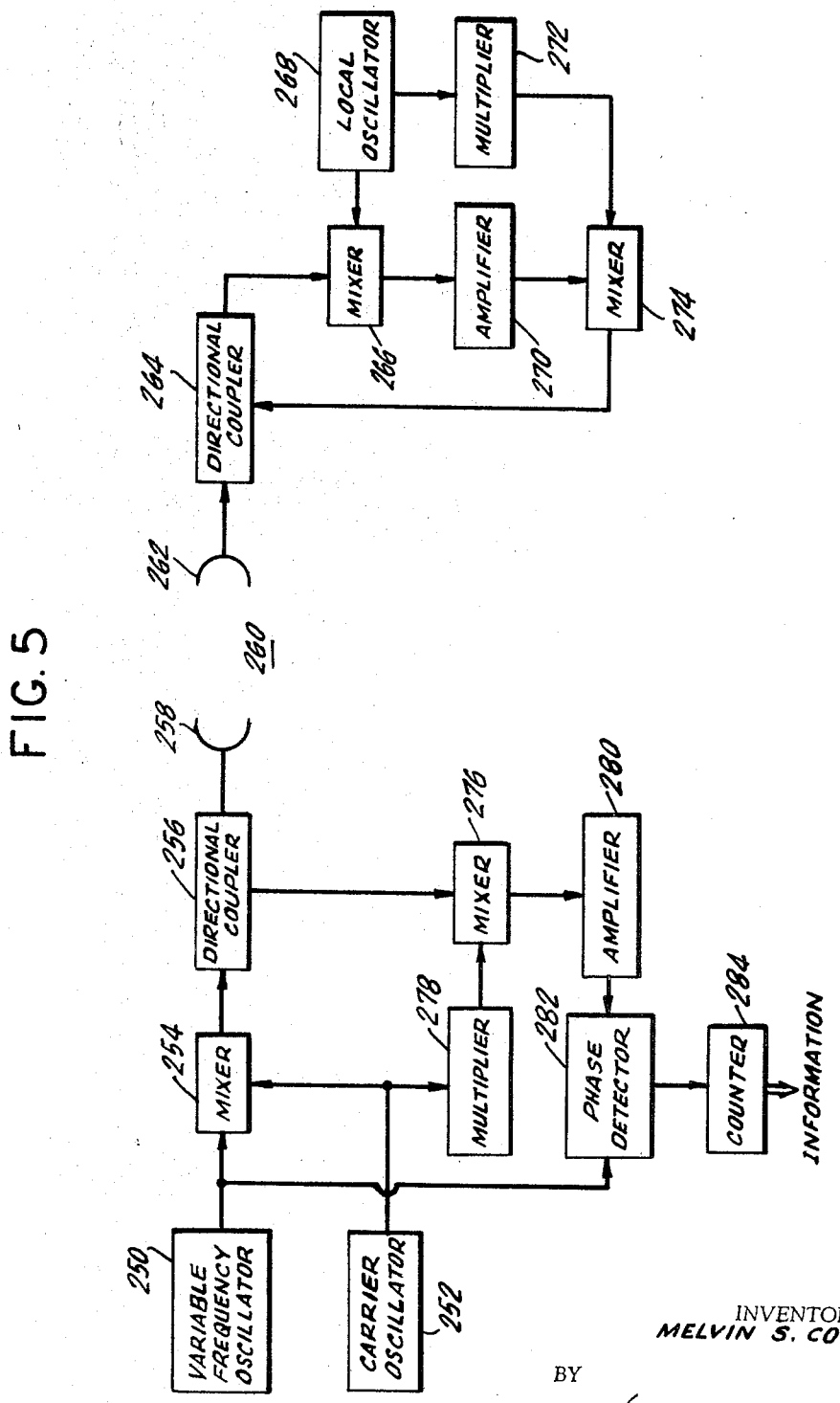

United States Patent Office 3,438,032
Patented Apr. 8, 1969

3,438,032
APPARATUS FOR AND METHOD OF MEASURING LENGTH
Melvin S. Cook, Kings Park, N.Y., assignor to Holobeam, Inc., Paramus, N.J., a corporation of Delaware
Continuation-in-part of application Ser. No. 621,952, Mar. 9, 1967. This application May 4, 1967, Ser. No. 636,198
Int. Cl. G01s 9/04
U.S. Cl. 343—12          16 Claims

ABSTRACT OF THE DISCLOSURE

This invention is a distance determination apparatus and system for use over free space. Radiation is transmitted to an object from a source located at a predetermined location. The phase of the transmitted radiation or of a modulation signal imposed on transmitted radiation is compared with the phase of a signal coming from the object. The frequency of the transmitted radiation, or of the modulation signal if a carrier is utilized, is varied over some range and the number of cycles of phase difference thereby generated and detected is utilized as a measurement of distance. This system also allows the use of an active return in a system in which frequency dependent phase errors arise.

---

This is a continuation-in-part of my prior application Ser. No. 621,952, filed Mar. 9, 1967, now abandoned.

This invention relates to apparatus for and methods of measuring a distance by detecting cycles of phase difference generated between radiated and received electromagnetic radiation as the frequency of the radiation or of a signal modulating carrier radiation is varied monotonically over some range of values. The invention allows measurements of high accuracy to be made of a range of distances where methods and apparatus currently known in the art are unsatisfactory and inconvenient.

A common technique used in measurement of distance involves counting of clock pulses during a time interval between emission of a pulse of radiant energy and detection of energy reflected from an object located at the distance of interest and originating with the emitted pulse. The resultant measurements are subject to errors which are significant and intolerable for some applications such as land surveying over distances in ranges of interest. These errors derive from uncertainty in knowledge of exact times of pulse emission and detection as well as from errors deriving from clock count ambiguity in measuring time intervals between such pulse emission and detection. The errors thus arising are relatively insensitive to the distance measured, and if the distance is sufficiently large then pulse techniques are sufficiently accurate.

Another technique known to the art involves changing the frequency of a source at some known rate and heterodyning the returning signal with radiation being emitted in order to obtain a measure of the distance of a reflecting object. This latter technique requires very accurate control of the rate of change of the emission frequency, which is difficult to manage when high distance measurement accuracies are required.

One object of the present invention is to provide a method that can be used to obtain an accurate measurement of a distance between two points.

A further object is to provide a distance determination means and method which does not require pulse count between transmission and reception.

An additional object of the present invention is to provide apparatus for performing the method of the present invention.

The invention is based upon the following considerations.

It is well known that distance can be measured in units of a known wavelength of electromagnetic radiation. The relation obeyed is given by the following equation:

$$\angle = m\lambda \quad (1)$$

where $\angle$ is the distance of interest, $\lambda$ is the known wavelength of the electromagnetic radiation, and $m$ is the number of wavelengths required to span distance $\angle$. This concept lies at the root of interferometric techniques of measuring distance where one mirror of an interferometer is moved from an initial to a final point separated by the distance to be measured while the interferometer is illuminated by a source of well defined wavelength and resultant changes in fringe patterns arising from interference of multiply reflected beams of radiant energy traversing different paths are measured. These techniques are well known and are treated in sources such as the book by Max Born and Emil Wolf entitled, "Principles of Optics," and published by Pergamon Press in 1959. Such techniques as are presently known use an electromagnetic radiation source of well defined frequency during the measurement of the distance of interest. The present invention is based upon somewhat different considerations, however, although it is not limited to electromagnetic radiation and could be used in sonic techniques.

If $c$ is the velocity of propagation of electromagnetic radiation in free space and $f$ and $\lambda$ are the frequency and wavelength of this radiation, then the following relation is obeyed.

$$c = f\lambda \quad (2)$$

Substituting Equation 2 into Equation 1 gives:

$$\angle = mc/f \quad (3)$$

If two different values of $f$, say $f_1$ and $f_2$ are used to measure $\angle$, then two different values of $m$ will be in correspondence with $f_1$ and $f_2$ if $\angle$ is constant, say $m_1$ and $m_2$, respectively. If $\Delta f = f_1 - f_2$ and $\Delta m = m_1 - m_2$, then the following relation will be obeyed.

$$\angle = c\Delta m/\Delta f \quad (4)$$

Suppose that an object and a source are held at a constant distance of separation equal to $\angle$, and a phase comparison is made between radiation being emitted from the source and being received at the source after traveling to the object being reflected from the object, and then returning to the source. Then the number of cycles of phase difference generated as the frequency of the radiation is changed over a range equal to $\Delta f'$ is equal to $\Delta m'$ where, however, the distance difference of the different path lengths is now equal to $2\angle$, so that the appropriate equation obeyed is:

$$\angle = \frac{c\Delta m'}{2\Delta f'} \quad (5)$$

where it is assumed that no phase change has occurred during the process of reflection. If such a phase change does occur on reflection, then it is easily compensated for.

Two possible ways of changing $f$ so that $\Delta m'$ can be measured exist. The first technique involves changing $f$ from a known initial value $f_1$ to a known final value $f_2$ in sufficiently small discrete increments so that $\Delta m'$ can be measured without missing any counts of cycles of phase change and with each intermediate value of $f$ being held for a sufficient period of time so that the relative phase between electromagnetic radiation being transmitted and received can be measured. The second technique involves changing $f$ from a known initial value $f_1$ to a known final value $f_2$ in a continuous manner in such a way that relative phase measurements are continuously made between electromagnetic radiation or of signals impressed thereon being transmitted and received. For both techniques, the difference in path length must be less than the coherence length appropriate to the transmitted radiation involved in the measurement.

If $\delta\angle$ is the coherence length, that is the distance of propagation for a wavetrain of electromagnetic radiation for which phase coherence is maintained so that the phase comparison between beams deriving from a given source but following different paths can be meaningfully made in order to measure distance using the present invention, and if $\delta f$ is the effective frequency range of the Fourier spectrum of the transmitted electromagnetic radiation and $f$ is its center frequency, then it is well known that the following relation is a meaningful indication of the relation obeyed by $\delta f$ and $\delta\angle$:

$$\delta\angle \sim \frac{c}{\delta f} \qquad (6)$$

Thus, for example, if $\delta\angle = 2\angle$ and if $\angle = 10{,}000$ feet, then $\delta f \leqslant 50{,}000$. Herz must be satisfied. This requirement on $\delta f$ for $\angle = 10{,}000$ feet is one that can be satisfied. In fact, sources are well known where $\delta f \leqslant 2{,}000$ Herz. If a time $\tau$ is required for radiation to propagate to an object from a source and to return, then Equation 6 gives us the condition:

$$\delta f \leqslant \frac{1}{\tau} \qquad (7)$$

where $\delta f$ must include the change in the Fourier spectrum generated by the change in $f$ during the time required for radiation to propagate the distance $2\angle$. Now, for example, if $\angle = 10{,}000$ feet and $\delta f = 30{,}000$ Herz, then a $\Delta\delta f \leqslant 20{,}000$ Herz must be effectively satisfied. The time of propagation for electromagnetic radiation to traverse a distance $2\angle = 2{,}000$ feet through air is approximately $t' = 2 \times 10^{-5}$ seconds. Except for phase measurements at the start or the stop of the sweep through the frequency range $f_2 - f_1$, the exact value of phase is not of great interest. If $f_2 - f_1$ is sufficiently great, even the values at $f_2$ and $f_1$ are not of great interest. Thus the present invention has an additional advantage over techniques of measuring distance which require making a significant number of phase measurements of very high accuracy, since such high accuracy phase measurements require significant measurement times and possibly involve averaging many determinations in order to achieve accuracy. If $t''$ seconds is the response time of the phase detector utilized to make measurements of relative phase between the two beams, then the rate of change of $f$ with respect to $t$, where the technique of changing $f$ continuously is used, must satisfy preferably the following inequality:

$$\frac{df}{dt} < \frac{\delta f}{\tau'} \qquad (8)$$

where $\tau'$ is the greater of either $t''$ or $\tau$. Using as an illustrative example a case where $t'' = 10^{-8}$ seconds, $t' = 2 \times 10^{-5}$ seconds, and $\delta f \sim 25{,}000$ Herz, solely in order to demonstrate the relationships obeyed, then:

$$\frac{df}{dt} < 1.25 \times 10^9 \text{ Herz/second} \qquad (9)$$

If the technique for changing $f$ using discrete increments were to be utilized in the present invention, then a sufficient number of different measurement points of $f$ would have to be used so that none of the cycles of relative phase change between the two beams generated as $f$ is changed over the range $\Delta f$ was missed. This condition is required to obtain an accurate value for the distance $\angle$. Thus, for this technique, the following inequality is a useful rule:

$$\frac{df}{dt} \leqslant \frac{\Delta f}{kt''\Delta m'} \qquad (10)$$

where $k$ is the number of points per cycle of phase difference (generated as $f$ is changed) that must be sampled in order to unambiguously obtain a true count for $\Delta m'$. Of course, in any of the above, it is possible that other factors will enter to lower the maximum values indicated for $df/dt$. In particular, when a receiver-transmitter is located at the object point to detect energy emitted by the source, then additional time delays will generally enter to lower the acceptable values of $df/dt$.

Of course, it would be possible in some cases to sample the energy of the beam being transmitted from the source and to pass this energy through a delay line prior to making a relative phase measurement with energy received at the source from an object transmitter. This would, for example, tend to increase the maximum acceptable magnitude of $df/dt$. Introduction of such a delay line could serve to increase the range of $\angle$ which could be measured. If desired, it could be used to lower the quality requirements of the frequency source in the sense that a larger value of $\delta f$ could be tolerated.

It should be clear to those skilled in the art that frequency dependent phase shifts can enter such measurements as are indicated above, arising in antennas, amplifiers, filters, or in other components such as may be used in apparatus constructed according to the present invention. However, if $\Delta f$, $f_1$ and $f_2$ are fixed for any particular apparatus, then the apparatus can be calibrated to obtain an error correction term, which should be relatively insensitive to the size of $\angle$.

It should be obvious to those skilled in the art that the apparatus located at the source and at the object points should be well aligned with respect to each other, so that electromagnetic energy propagating between source and object points satisfy the conditions for optimum operation. This alignment, where desired, could easily be carried out by use of such equipment as optical telescopes mounted on the equipments at source and object points or by utilizing field intensity meters to optimize alignment.

Where possible, this invention may be used when merely a passive reflector is located at the object point.

While it is simplest to count only full cycles of relative phase change generated as $f$ is varied, in many cases it is desirable to interpolate between such full cycle counts in order to increase the accuracy with which the distance $\angle$ is measured. This consideration is particularly important for the lower range of values $\angle$ since $\Delta m'$ is proportional to $\angle$. It is the relative phases of the two beams at only the initial frequency $f_1$ and the final frequency $f_2$ for which high accuracy is required to enhance the accuracy of the measurement of the distance $\angle$. It is possible to incorporate in apparatus constructed according to the present invention features to facilitate such initial and final high accuracy measurements of the desired relative phase between the two beams. For example, very long sample times to measure relative phase can be used in the initial and final phase measurements and $df/dt$ can be made initially and finally very small. It could also be arranged that physical movement over calibrated increments in $\angle$ were possible for the equipment, say by mounting the equipment on a calibrated screw; or else that a variable delay line were incorporated in the path of one of the beams, so that full increments of relative cyclic phase could be simulated at end points of the frequency range defining $\Delta f$. Detection of extrema is normally relatively easier to manage than measurement of points between extrema when significant accuracy is required. Corrections to be then applied to the apparent value of $\angle$ measured in order to obtain a more accurate value for the true magnitude of $\angle$ could be easily determined.

It should be clear to those skilled in the art that many ranges of frequencies may be employed in developing a $\Delta f$. The possible choice of a carrier wave frequency is quite flexible and the optimum choice in any given case must depend on numerous factors. For example, depending upon the range of frequencies employed during the measurement of the distance of interest, upon the mode of operation, and the range of distances of interest, many oscillators, amplifiers, detectors, antennas, or other components could be suitable for use in apparatus constructed according to the present invention.

The invention will now be described with reference to the accompanying drawings, in which:

FIG. 1 is a schematic diagram illustrating one exemplary embodiment of apparatus constructed using the present invention and in which the frequency $f$ of the source is changed in discrete increments;

FIG. 2 is a schematic diagram illustrating an exemplary embodiment of apparatus constructed according to the present invention and in which the frequency $f$ of the source is changed in a continuous manner;

FIG. 4 is a schematic diagram showing an exemplary embodiment of the present invention in which a phase-lock circuit is used to control the frequency of a reference oscillator at the object location; and FIG. 5 is a schematic diagram illustrating an exemplary embodiment of apparatus constructed according to the present invention in which carriers of different frequencies are utilized.

Figure 3:
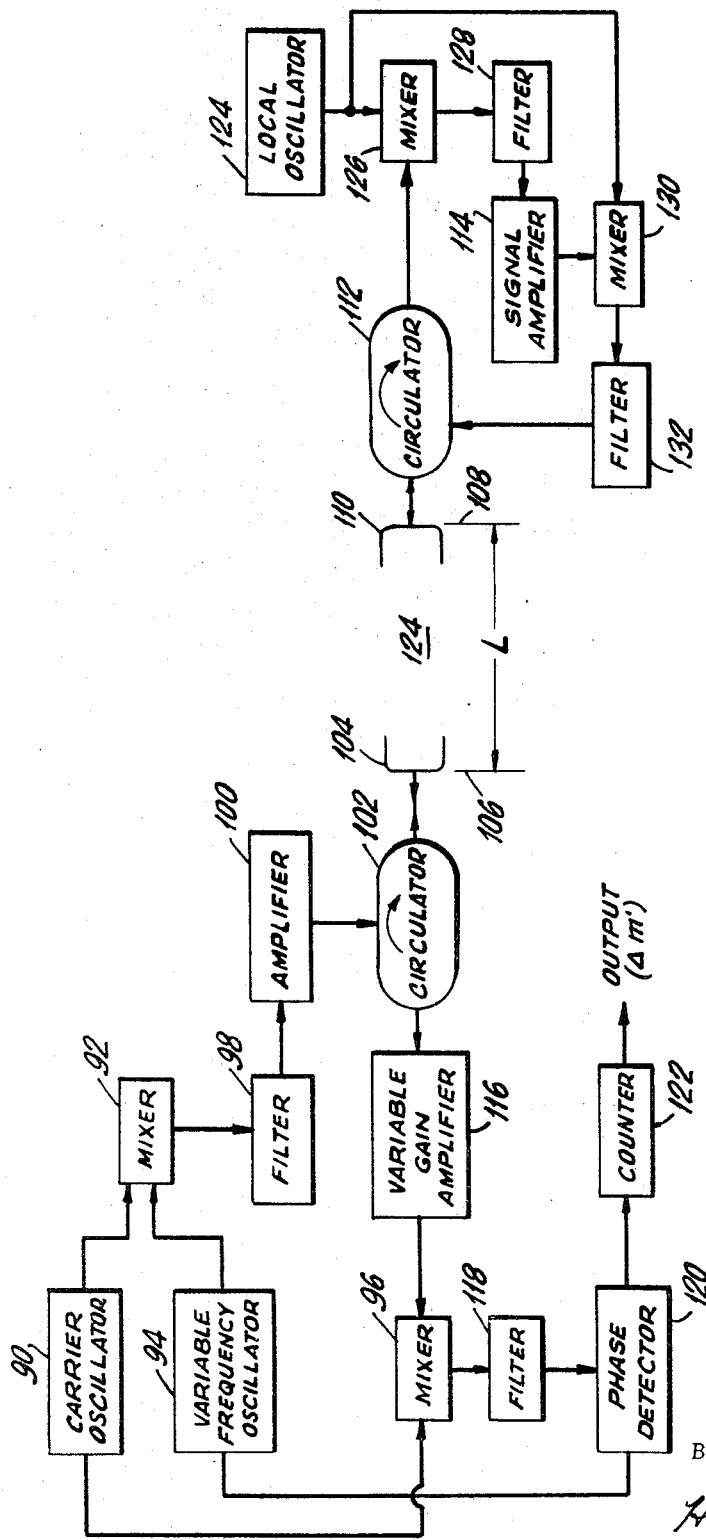
FIG. 3 is a schematic diagram illustrating an exemplary embodiment of apparatus constructed according to the present invention in which the frequency $f$ of an oscillator is changed in a continuous or discontinuous manner and is used to modulate a carrier wave of fixed frequency $w$.

The apparatus shown in FIG. 1 comprises a frequency synthesizer 12 feeding into a multiplier 14 which is capable of producing a harmonic of the frequency produced in the frequency synthesizer 12. The frequency synthesizer 12 is commanded by the programmer 16 to feed energy of a given but variable frequency into the multiplier 14. The output of the multiplier 14 is fed through a filter 18 to a directional coupler 20. The filter 18 is designed to pass only the frequency of interest at any given time. The directional coupler 20 passes a sample of the energy received via the filter 18 to a variable attenuator 22 but passes the major portion of the energy received to a pulse amplifier 24. The output of the pulse amplifier 24 is fed to a source transmitting antenna 26 from which it is radiated into free space 28 located between source 30 and object 32, which are separated by a distance equal to $\angle$.

It is essential that the energy transmitted from source to object and the return be in free space, in order to avoid questions related to cutoff frequencies, resonances, frequency dependent phase shifts, effective wavelengths of radiation inside waveguides or coaxial cables. I, of course, wish to avoid propagation through waveguides or wires since not only would it be required that all their relevant physical characteristics be known but they would have to be exactly equal in length to the unknown distance which is to be measured. If such equality of length is established, it is equivalent to making the measurement and thus the invention need not be utilized. This is so since the length required can be calibrated as is a tape, for example.

Energy radiated from the source transmitting antenna 26 is received at an object receiving antenna 34 and fed to an amplifier 36. The output of the amplifier 36 is fed to an object transmitter antenna 38 which radiates this energy into the free space 28. A source receiver antenna 40 receives some of the energy radiated from the object transmitter antenna 38 and feeds this detected signal into a variable gain amplifier 42. The outputs from the variable gain amplifier 42 and the variable attenuator 22 are adjusted to be of approximately equal amplitude and feed into a phase detector 44. The number of cycles of relative phase change detected in the phase detector 44 as the frequency of the frequency synthesizer 12 is changed in appropriate discrete steps is counted by a counter 46 and used to find the magnitude of the distance $\angle$ by use of Equation 5 and by using the correction term, obtained by calibrating the apparatus when an accurately known $\angle$ is measured with the equipment. A simple computer or an operator can make the calculation.

Referring to Equation 5 $c/2$ is a factor whose value is dependent on such factors as relative humidity and temperatures, and can be calculated after measuring these quantities, and it is possible to vary $f$ over a known range; therefore $\angle = k' \Delta m'$ and a scale can be used to give direct readouts on an indicator.

The apparatus shown in FIG. 2 comprises an oscillator 50 whose output frequency is continuously variable and can be controlled by a scan means. This oscillator feeds its output into a filter 52. The filter 52 passes only energy of the desired frequency into a directional coupler 54.

A sample of the energy fed into the directional coupler 54 is passed to a delay line 56. The output of the delay line is fed into a variable gain amplifier 58. This variable gain amplifier 58 feeds its output into a power divider 60. One output of the power divider goes to a frequency discriminator 64 which puts out a signal whose magnitude and polarity depend upon the difference between the frequency fed into the frequency discriminator 64 and the value of either $f_1$ or $f_2$ of frequency which define the extreme of the frequency range $\Delta f$. When a null in the output of the frequency discriminator 64 is detected by a null detector 66, then a signal is sent to a counter 68 by the null detector 66 in order to stop the counter 68 from counting further any output information from a phase detector 62. The second output of the power divider 60 goes to one input of this phase detector 62. The second output of the directional coupler 54 is fed into an amplifier 72 which amplifies the input signal and sends it to a source transmitter antenna 74 which radiates the energy received into free space 80 located between a source point 76 and an object point 78, which are separated by the distance $\angle$. An object receiver antenna 82 receives energy transmitted from the source transmitter antenna 74 and sends this energy to an amplifier 84 which amplifies the received signal and sends the amplifier signal to an object transmitter antenna 86. The object transmitter antenna 86 radiates the energy received from the amplifier 84 into the free space 80. A source receiver antenna 88 receives energy transmitted from the object transmitter antenna 86 and sends a signal to a variable gain amplifier 70 which in turn feeds into the phase detector 62. The phase detector 62 compares the relative phase of the signals received from the variable gain amplifier 70 and the power divider 60. As the frequency of the output of the oscillator 50 is changed from an initial value to a final value to generate a frequency difference $\Delta f$, the counter 68 will count the number of cycles of relative phase change equal to $\Delta m'$ which is developed. This output of the counter 68 can be used to calculate the magnitude of the distance $\angle$ when correction to the counter 68 output reading has been calibrated by using the instrument to measure an accurately known calibration distance.

In FIG. 3, a carrier oscillator 90 generates energy of frequency $w$ and feeds it into a mixer 92. Another input of frequency $f$ into the mixer 92 comes from a variable frequency oscillator 94. The output of the mixer 92 goes to a filter 98 which passes only the desired signal to an amplifier 100. The amplified signal out of the amplifier 100 goes to a circulator 102 which passes it to a source antenna 104 located at a source point 106 separated a distance $\angle$ from an object point 108 with a free space 124 lying between the object point 108 and the source point 106. The signal emitted from the source antenna 104 is received by an object antenna 110 located at the object point 108 after passing through the free space 124. The object antenna 110 passes the received signal through a circulator 112 to a mixer 126 which also receives energy from a local oscillator 124. The mixer 126 passes energy through a filter 128. The output of the filter is amplified in a signal amplifier 114. The output of the signal amplifier 114 is sent to a mixer 130 which also receives energy from the local oscillator 124. The output of the mixer 130 is filtered by filter 132. The filtered output of the filter 132 is sent to a circulator 112 which sends it to the object antenna 110. The object antenna 110 emits this energy into the free space 124. The source antenna 104 receives this signal and passes it to the circulator 102 which sends this energy to a variable gain amplifier 116. The output of the variable gain amplifier 116 is fed to a mixer 96. Another input to this mixer comes from the carrier oscillator 90. The output of this mixer 96 is sent to filter 118 which passes only the signal of freqlency $f$ to a phase detector 120. A second input to the phase detector 120 comes from the variable frequency oscillator 94. The relative phase of these two inputs is measured and the phase detector 120 feeds into a counter 122 which records the number of cycles of relative phase shift developed as the frequency $f$ of the variable frequency oscillator is tuned through $\Delta f$. The count $\Delta m'$ obtained from the counter 122 is used to obtain the value of $L$ after suitable correction terms obtained by calibration are applied to the value of $L$ obtained from $\Delta m'$.

In FIG. 4 is shown the preferred embodiment of a frequency modulated carrier mode of operation in which a phaselock circuit is used to control the frequency of a reference oscillator at the object location. Because the band width of this phase-tracking circuit need be large enough only to pass the difference between the signal frequency and the frequency of a voltage-controlled references oscillator, the amount of noise present in the loop is much smaller than in a comparable nontracking filter which must accept all the possible variations in modulation frequency $f$. Since $f$ may vary over a significant range, the advantages in using such a phase-lock circuit as is shown in FIG. 4 is obvious. Due to the narrow band width of the phase-control loop, it is possible to maintain synchronism of the reference oscillator to the carrier frequency $w$ even where the signal-to-noise ratio of the signal received at the object location is quite low.

In the embodiment shown in FIG. 4, continuous operation is employed. It is possible to use a pulsed mode of operation with synchronous detection, but it is somewhat more difficult to control the reference oscillator frequency in the pulsed mode than in the continuous mode of operation because of the intervals that exist in the pulsed mode when no signal is present.

In the embodiment shown in FIG. 4, a carrier oscillator 200 feeds energy at frequency $w$ into a directional coupler 202. The directional coupler 202 passes most of the energy so received to a mixer 204 and passes a sample of this energy to a mixer 206 which also receives energy from a source receiving antenna 208. A variable frequency oscillator 210 generates energy at frequency $f$ which it passes to a directional coupler 212, which in turn, passes most of this energy to the mixer 204 which is also receiving energy at frequency $w$. The output of this mixer 204 is fed into a filter 214 which passes energy at frequency $f+w$ to a source transmitting antenna 216. The source transmitting antenna radiates this energy into free space 218 located between the source and object. An object receiving antenna 220 passes received energy to a mixer 222, which also receives energy at frequency $f'$ from a reference oscillator 230. The output from this mixer 222 is passed through a filter 224 which selectively lets through energy at the frequency $f+w-f'$. The filter 224 feeds through a directional coupler 226 to an amplifier 228. Part of the filter 224 output is fed from the directional coupler 226 to the reference oscillator 230 in order to supply a voltage to the reference oscillator 230. The reference oscillator 230 is controlled by this voltage to synchronize on the signal. In this synchronization, the phase of the reference signal from the reference oscillator 230 is synchronized automatically to the incoming signal. The output of the amplifier 228 is sent to a mixer 232 which also receives a signal from the reference oscillator 230. The output of the mixer 232 is passed through a filter 234 and energy at frequency $f+w$ is sent to an object transmitting antenna 236 from which it is radiated into the free space 218 located between the source and the object. A source receiving antenna 208 receives energy radiated by the object transmitting antenna 236 and passes this energy to the mixer 206 as previously indicated. The output of this mixer 206 is passed to a filter 238 which selectively passes energy at frequency $f$ to a phase detector 240 which also receives energy from the directional coupler 212 fed by the variable frequency oscillator 210. The output of this phase detector 240 is sent to a counter 242 which counts the number of cycles of relative phase change generated as the variable frequency oscillator 210 varies over some range of frequency. The output of this counter 242 is used to obtain the value of $L$, the separation of the source and object, as indicated previously.

In FIG. 5, an embodiment of the present invention is shown in which different carrier frequencies are used in transmitting energy from the source and in transmitting energy from the object. Such a separation in value of carrier frequencies enables transmitted and received signal information to be unambiguously separated.

In the embodiment shown in FIG. 5, energies from a variable frequency oscillator 250 and from a carrier oscillator 252 are mixed in a mixer 254 and then sent via a directional coupler 256 to a source antenna 258 from which it is radiated into free space 260 located between the source antenna 258 and an object antenna 262. The object antenna 262 routes received energy via a directional coupler 264 to a mixer 266. Another input to this mixer 266 comes from a local oscillator 268 preferably emitting energy like in frequency to the carrier oscillator 252 located at the source. The output of the mixer 266 is sent to an amplifier 270. The amplifier 270 sends its output to a mixer 274 which also receives energy from a multiplier 272 fed by the local oscillator 268. The output from the mixer 274 is sent via the directional coupler 264 to the object antenna 262 from which it is radiated into free space 260. The source antenna 258 receives energy so radiated and sends it via the directional coupler 256 to a mixer 276. This mixer 276 is also fed energy from a multiplier 278 in turn fed by the carrier oscillator 252. This multiplier 278 preferably multiplies by the same factor as the multiplier 272 located at the object. The output of the mixer 276 is sent via an amplifier 280 to a phase detector 282 which also receives energy from the variable frequency oscillator 250. A counter 284 connected to the phase detector 282 counts the number of cycles of relative phase change generated as the frequency of the variable frequency oscillator 250 is swept over some range. The output of the counter 284 is used to obtain the value of $L$, the distance of separation of source and object.

While the particular embodiment shown in FIG. 2 involves the use of a null detector 66 in conjunction with a frequency discriminator 64, an alternative approach can be used. Since the output of the frequency discriminator 64 has a polarity dependent upon whether the frequency of the energy leaving the power divider 60 is greater than or lesser than one of the extrema of frequency $f_1$, $f_2$ defining $\Delta f$, the polarity of the output of the frequency discriminator 64 can be used together with a circuit sensing whether the magnitude of the signal output of the frequency discriminator 64 is increasing or is decreasing when its polarity has one of the two possible directions to control the counter 68 instead of the null detector 66 shown in FIG. 2. Then, when the polarity of the signal out indicates $f$ is outside the limits defining $\Delta f$ but the magnitude of this signal is increasing the counter 68 can count in one direction, whereas when the magnitude of this signal is decreasing but the polarity still indicates that $f$ is outside the range defining $\Delta f$ then the counter can count in the opposite sense. The net effect is to cancel out the error in $\Delta m'$ resulting from swinging out beyond accurately known values of $f$ defining the extrema of a range of frequencies $\Delta f$.

In the embodiment shown, care must be taken to provide adequate isolation between transmitted and received radiation at the source location. We have shown that it is possible to accomplish some degree of isolation by utilizing separate antennas for transmission and reception purposes. Alternative techniques accomplish the required purpose. For example, if pulsed operation is used, then a portion of the source energy can be passed through a delay line and energy at the object point can likewise be passed through a delay line. If necessary, amplifiers can be used to increase signal levels to powers required for proper use of delay lines. After transmission has been discontinued, energy can be received at the source without the severe problems that can occur in certain frequency ranges when energy is being transmitted at the same time it is being received. The energy received and the energy coming from the delay line at the source can be then fed into a phase detector. Another approach is to use radiation of frequencies sufficiently high that isolation of the required amount can be provided. Another technique would involve use of a square law detector such as a crystal detector which would respond to the phase difference between a portion of the energy being transmitted and the energy being received. Using different source and carrier frequencies would also tend to overcome the isolation problem mentioned above.

One of the substantial advantages derived from the foregoing invention is that it makes possible the use of an active return. By so doing, the return signal is strong enough and is easily identified and there is no loss of phase coherence. Further, any frequency dependent phase error which is introduced in the active return or any other part of the invention is constant because of the use of fixed frequency limits.

In order to determine the distance error because of delay introduced by the amplifier at the target or from other frequency dependent phase errors over the frequency range, an initial reading is made of a known distance $L_0$ which may be determined by a count $N_0$. Since the frequency range is constant, the error introduced is known. As a result, the zero point of the counter can be moved $\Delta N$ cycles to reflect this error.

Use of a carrier of frequency $w$ modulated in frequency or amplitude by the variable frequency $f$ has certain advantages. If $w$ is sufficiently high, then the antenna directivity for a given size antenna is greater. That is, the directive gain of a given size antenna along the path in free space between the source and object is greater when the frequency of the transmitted radiation is greater. Further, the isolation between transmitted and received radiation is improved by going to higher frequencies, as one does effectively by using a carrier of frequency $w$ greater than $f$. In addition, the size of the antenna required is inversely related to frequency, and the use of a carrier frequency $w$ sufficiently high in magnitude would reduce the size of the antennas required in use of the invention. As should be clear, use of laser radiation as a carrier would give very great directivity and isolation. Direct use of high frequencies $f$ in the range indicated for $w$ is not always feasible or possible, since it may not be possible or convenient to tune over a frequency range when the frequency is high. In addition, power output is generally reduced when the frequency source is designed so that it can be tuned over a significant frequency range rather than when it operates over a narrow frequency range.

In the embodiment shown in FIG. 1, a frequency synthesizer-multiplier-filter arrangement was used as the source of energy of frequency $f$ fed into the directional coupler. In many cases, this combination could be replaced by a single oscillator tunable in frequency $f$ over the range defining $\Delta f$.

When a counter is used to record a count, there is a plus or minus one count ambiguity. This means that several measurements must be made of $\Delta m'$, unless the counter can somehow be preset to a known condition, and an average or best value selected from the value of $\Delta m'$.

It should be pointed out that the present invention has an additional advantage of considerable value. In a distance measuring technique, problems frequently arise due to reflections from the ground or from other objects of the transmitted energy. While in a system employing an active object, these effects are usually less important than in systems using a passive reflector at the object nevertheless, errors in the apparent range enter. The source of these errors in a system measuring time intervals between pulse emission and the time of return of an echo is obvious. When a CW system is employed, an error in phase occurs as a result of spurious reflections. These can be seen from the equation below:

$$A \exp(ift) + B \exp(ift+\varphi)$$
$$= C \exp(ift+\gamma) \quad (11)$$

If phase differences between a small number of transmitted frequencies are employed in a measuring technique, the errors in phase, the $\gamma$ in Equation 11, lead to an erroneous result for the measurement.

In the present invention, the effect of such errors are minimized and, in fact, tend to be of significance in only the initial and final phase measurements. It is only necessary that such phase errors are a continuous function and that the resultant values of phase error do not result in giving erroneous counts for the integral number of cycles of relative phase change generated as the frequency range is swept. Thus, except for the lower range of distances, errors from spurious reflections tend to be of less importance in the present invention than in other techniques known in the art.

Although a preferred embodiment of this novel invention has been described, many variations and modifications will be apparent to those skilled in the art. Therefore, this invention is to be limited, not by the specific disclosure herein, but only by the appending claims.

What is claimed is:

1. An apparatus for measuring the distance L to a target in free space comprising,
    means for transmitting periodic signals to said target in free space,
    active means for retransmitting return signals from said target including
    receiving means for comparing the phase between transmitted and received signals
    said receiving means including means for varying the frequency of the transmitted signals over a selected range from $f0$ to $fx$, said phase comparison means determining the phase variations and means to determine the number of cycles of phase variations M to provide thereby a representation of the distance from the transmitting means to the distance from the transmitting means to the target in accordance with $$L = \frac{KM}{fx - f0}$$

where K is a constant depending on C, C being the speed of transmission of radiation in free space.

2. A process for determining distance from selected location to a target comprising
    transmitting periodic signals at a first frequency from said location to said target,
    amplifying said signals at said target and retransmitting said signals to said location,
    receiving the return signals at said location from said target, varying the transmitted frequency over a predetermined range, continuously determining the phase difference between transmitted and received signals and thereby providing cyclical phase variations, determining the number of cycles of phase difference and to provide a representation of distance from location to target in accordance with the said number of cycles divided by the frequency range.

3. The process of claim 2 including the step of determining the phase delay distance error introduced during the amplification step, and correcting said distance determination in accordance with said phase delay distance error.

4. A method for beaming of electromagnetic radiation between a source and an object separated by a distance whose magnitude is of interest, source and object each being capable of receiving and radiating electromagnetic energy, measuring the relative phase between energy being transmitted from source and energy being received from object, object receiving energy of some frequency from source and radiating energy back to source of same frequency and related in phase to received energy, counting cycles of change in relative phase at said source developed as frequency of energy transmitted by source is varied monotonically in frequency over some range, determining the distance of interest utilizing the total relative phase change developed divided by the frequency change corresponding to said phase change.

5. The apparatus of claim 1 in which the frequency is varied continuously in the same direction.

6. The apparatus of claim 1 in which the frequency is varied intermittently.

7. The apparatus of claim 1 in which the object includes an active transmitter.

8. The apparatus of claim 1 in which said transmitting means includes source means including a variable frequency oscillator, means to couple the output from the source means to a transmitting element and to said phase comparison means, counting means responsive to the output of said phase comparison means to count the number of complete cycles.

9. The apparatus of claim 7 including means to determine the start frequency $f0$, and the end frequency $fx$ and to determine the desired distance in accordance with the pulse count M divided by $fx-f0$.

10. The apparatus of claim 1 in which said source means includes frequency multiplication means, and means to program the desired frequency output.

11. The process of claim 2 in which the signals are retransmitted from said target at a different frequency from the tranesmitted frequency, whereby the carrier frequency separation enables informats to be unambiguously separated, and in which the retransmitted frequency is converted to said first frequency after its return.

12. The invention of claim 1, in which said active means includes means for converting the signals and retransmitting return signal at a different frequency.

13. The apparatus of claim 8 including means coupled to said counting means to determine when the upper limit $fx$ is reached and to prevent the counter from counting in the opposite direction thereafter.

14. The apparatus of claim 1 including delay means coupled between said transmitting means and said phase comparing means.

15. The apparatus of claim 1, said transmitting means including a carrier frequency oscillator $w$ and a variable frequency oscillator providing a frequency $f$, mixing means for mixing said frequency signals to provide a signal $f+w$ which is transmitted, said active means including an internal reference oscillator providing a frequency $f'$ and a mixer, whereby said mixer provides a signal $f+w-f'$, said mixer having an output thereof applied to said internal oscillator, said active means including means to retransmit said signal at a frequency $f+w$, said transmitting means including mixing means to convert said received frequency to frequency $f$.

16. The apparatus of claim 1, including computing means to determine the distance L in accordance with cycles of phase variations M as set forth.

References Cited

UNITED STATES PATENTS

| | | | |
|---|---|---|---|
| 3,039,089 | 6/1962 | McMurtrey | 343—6.8 X |
| 3,113,309 | 12/1963 | Kuecken | 343—14 |
| 3,150,367 | 9/1964 | Harrington | 343—14 |
| 3,172,075 | 3/1965 | Kay | 343—14 X |
| 3,249,938 | 5/1966 | Blitz et al. | 343—14 |
| 3,271,766 | 9/1966 | Nilssen | 343—14 |
| 3,343,163 | 9/1967 | Crooks et al. | 343—6.5 X |

RODNEY D. BENNETT, JR., *Primary Examiner.*

JEFFREY P. MORRIS, *Assistant Examiner.*

U.S. Cl. X.R.

343—6.5